(12) United States Patent
Li et al.

(10) Patent No.: US 11,421,642 B2
(45) Date of Patent: Aug. 23, 2022

(54) FLEXIBLE MEMBRANE ISOLATOR

(71) Applicant: Ford Global Technologies, LLC, Dearborn, MI (US)

(72) Inventors: Na Li, Troy, MI (US); Scott Willis, Gibraltar, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 221 days.

(21) Appl. No.: 16/826,760

(22) Filed: Mar. 23, 2020

(65) Prior Publication Data

US 2021/0293215 A1  Sep. 23, 2021

(51) Int. Cl.
| | |
|---|---|
| *F02N 15/00* | (2006.01) |
| *F02N 15/02* | (2006.01) |
| *F02N 15/08* | (2006.01) |
| *F16D 41/064* | (2006.01) |
| *F16H 55/36* | (2006.01) |
| *F02N 11/00* | (2006.01) |
| *F16H 7/02* | (2006.01) |

(52) U.S. Cl.
CPC ........... *F02N 15/023* (2013.01); *F02N 15/08* (2013.01); *F16D 41/064* (2013.01); *F02N 11/003* (2013.01); *F16H 7/02* (2013.01); *F16H 2055/366* (2013.01)

(58) Field of Classification Search
CPC ...... F02N 15/023; F02N 15/08; F02N 15/063; F02N 11/003; F02N 11/04; F16D 41/064; F16H 7/02; F16H 2055/366
See application file for complete search history.

(56) References Cited

U.S. PATENT DOCUMENTS

| | | | | |
|---|---|---|---|---|
| 5,468,188 | A * | 11/1995 | Day | F16D 3/50 464/60 |
| 7,712,592 | B2 * | 5/2010 | Jansen | F16D 7/022 474/902 |
| 8,387,767 | B2 * | 3/2013 | Komorowski | F16D 27/105 192/84.961 |
| 9,638,270 | B2 * | 5/2017 | Antchak | F16H 7/20 |
| 9,651,099 | B2 * | 5/2017 | Antchak | F16D 41/206 |
| 9,689,486 | B2 * | 6/2017 | Williams | F16D 13/76 |
| 9,869,365 | B2 * | 1/2018 | Tran | F16F 15/1428 |
| RE47,406 | E * | 5/2019 | Antchak | F16D 7/022 |
| 10,767,724 | B2 * | 9/2020 | Tran | F16F 15/12346 |
| 2004/0014540 | A1 * | 1/2004 | Dell | F16D 3/12 474/69 |
| 2004/0104090 | A1 * | 6/2004 | Jansen | F16D 41/206 192/41 S |

(Continued)

FOREIGN PATENT DOCUMENTS

| | | |
|---|---|---|
| CN | 203219112 U | 9/2013 |
| CN | 108006150 A | 5/2018 |

(Continued)

*Primary Examiner* — Phutthiwat Wongwian
*Assistant Examiner* — Sherman D Manley
(74) *Attorney, Agent, or Firm* — Vincent Mastrogiacomo; McCoy Russell LLP

(57) ABSTRACT

Methods and systems are provided for an isolator. In one example, system may include an isolator comprising a flexible laminated membrane comprising a non-linear torsional stiffness for compensation of axial, lateral, and angular displacements between a drive shaft and a clutch.

18 Claims, 10 Drawing Sheets

(56) References Cited

U.S. PATENT DOCUMENTS

| | | | | |
|---|---|---|---|---|
| 2005/0250607 A1* | 11/2005 | Jansen | ................ | F16D 41/206 |
| | | | | 474/69 |
| 2010/0083456 A1* | 4/2010 | Norell | ................ | H02K 19/103 |
| | | | | 15/347 |
| 2014/0076683 A1* | 3/2014 | Williams | ............... | B60K 25/02 |
| | | | | 192/41 S |
| 2019/0010995 A1* | 1/2019 | Choi | .................... | F16D 41/069 |

FOREIGN PATENT DOCUMENTS

| | | |
|---|---|---|
| CN | 207683315 U | 8/2018 |
| KR | 101608596 B1 | 4/2016 |
| KR | 101632194 B1 | 7/2016 |

* cited by examiner

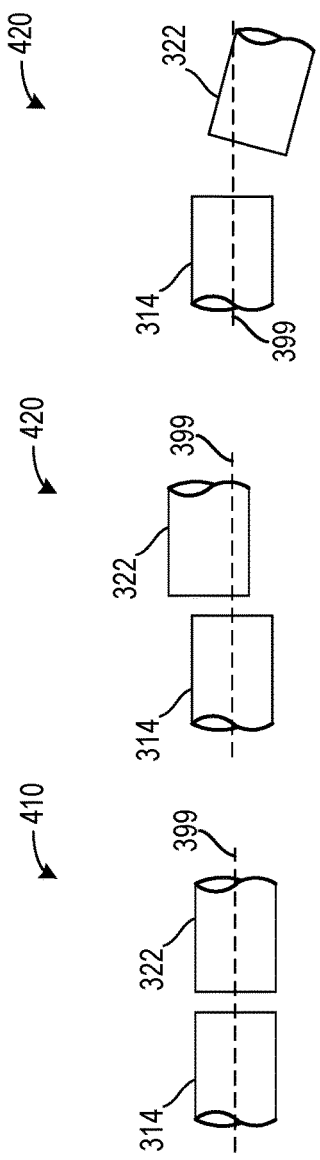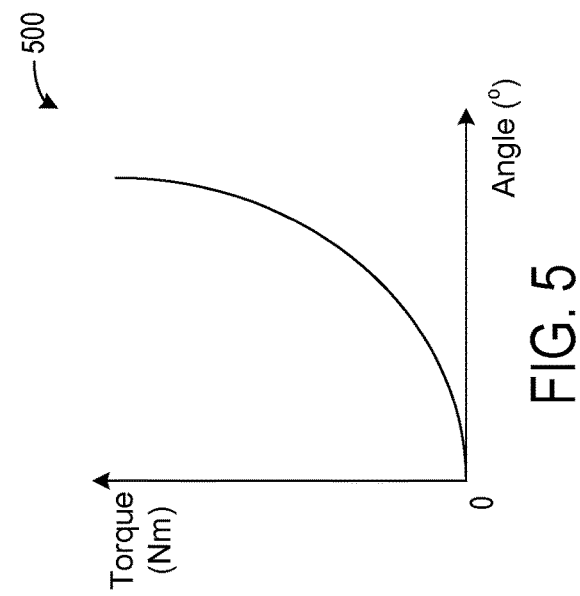

FLEXIBLE MEMBRANE ISOLATOR

FIELD

The present description relates generally to an isolator configured to reduce noise and vibrations for an alternator and/or a belt driven integrated starter-generator (BISG).

BACKGROUND/SUMMARY

Poly-wedge belt accessory drive systems have been widely used in engine front end accessory drive (FEAD) systems. FEAD systems may include one or more of a crankshaft pulley, a poly-wedge belt, a tensioner, an idler, and some driven pulleys like alternator or BISG pulley, an air compressor pulley, a water pump pulley, a power steering pulley, a fan drive pulley, etc. Dynamic characteristics of a FEAD system may comprise the vibration of pulleys and the pendulum of the tensioner arm, the tension fluctuation of each belt span, the slips between belt and pulley, etc.

Increasing the tensioner damping and/or increasing the initial belt tension can improve FEAD system dynamic characteristics. However, the higher tensioner damping and the higher material properties may lead to higher manufacturing costs. The higher belt initial tension can improve the natural frequency of each belt span and avoid the resonance during engine normal revolution scope; the higher belt initial tension may reduce the belt life, and increase the hub load of each pulley, which may lead to fatigue and accelerated degradation of the bearings and accessory shafts.

In the FEAD system, the rotor inertia of alternator or BISG is relatively large, and its rotating speed is generally 2-3 times greater than that of a crankshaft speed. The alternator or BISG pulley vibrates more than other FEAD system components and the slip rate between the pulley and belt usually is the maximum, thereby the belt wrapped on the alternator or BISG pulley may degraded fastest. Therefore, to reduce the dynamic characteristics effect from the alternator or BISG, an overrunning alternator decoupler (OAD) is installed between the alternator or BISG pulley and the rotor of alternator or BISG.

OAD is to improve the FEAD system dynamic characteristic: when an alternator or BISG pulley accelerates relative to the alternator shaft, the one-way clutch is engaged and the power transmitted to the alternator pulley will be transmitted to below components in sequence: the clutch outer ring, clutch inner ring, alternator shaft, the flexible laminated membrane, and the alternator rotor. The pulley and the rotor will rotate together. However, when the pulley decelerates relative to the alternator or BISG shaft, the one-way clutch is disengaged, and the alternator rotor and its shaft will overrun and rotate freely. To reduce the vibration of alternator or BISG, the slips of belt and the alternator or BISG pulley, and the impact of the alternator or BISG to FEAD system, the vibration between the alternator or BISG and the FEAD system is to be decoupled. This demands a suitable torsional spring stiffness and damping.

In an example OAD structure, torsional spring is installed in a carriage, which limits the inner diameter of the torsional spring and demands higher manufacturing process design. By decreasing the inner diameter of the torsional spring and maintaining a spring cross-sectional area, a greater torsional stiffness may be achieved. However, this may not improve the isolation between the alternator or BISG and the FEAD system. Other examples of OAD structure has identical pitch, identical spring inner diameter, and identical cross-sectional area, which will provide a constant (e.g., linear) torsional stiffness (e.g., a linear torsional stiffness curve). Therefore, the OAD may only decouple within a small frequency range.

One example approach is shown by Choi et al in U.S. Patent Application No. 2019/0010995. Therein, a sprag hub and a sprag limiter are used in conjunction to allow a shaft hub to rotate in one direction based on pulley movement. By doing this, vibration and noise generated between the pulley and the alternator may be decreased.

However, the inventors have identified some issues with the approaches described above. For example, axial, lateral, and angular displacements may occur during a lifespan of the alternator or BISG, which may result in unwanted noise and vibrations. The decoupler of the previous example may not be suited to compensate for these changes to the alternator geometry due to its rigidity, resulting in a poor user experience.

As one example, the flexible laminated decoupler may comprise a non-linear torsional stiffness which may allow it to mitigate vibrations and noises at a greater range than the previous example described above. The decoupler may compensate for axial, lateral, and angular displacements between the drive shaft and the one-way clutch by flexing in a desired direction to decrease a misalignment between the drive shaft and the one-way clutch, which would otherwise increase noise and vibrations undesirably.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A, 4B, and 4C illustrate various displacements between the one-way clutch and an alternator shaft;

FIG. 5 illustrates a torsion stiffness profile of the isolator;

FIGS. 3A, 3B, and 8A-8C are shown approximately to scale.

DETAILED DESCRIPTION

Figure 1:
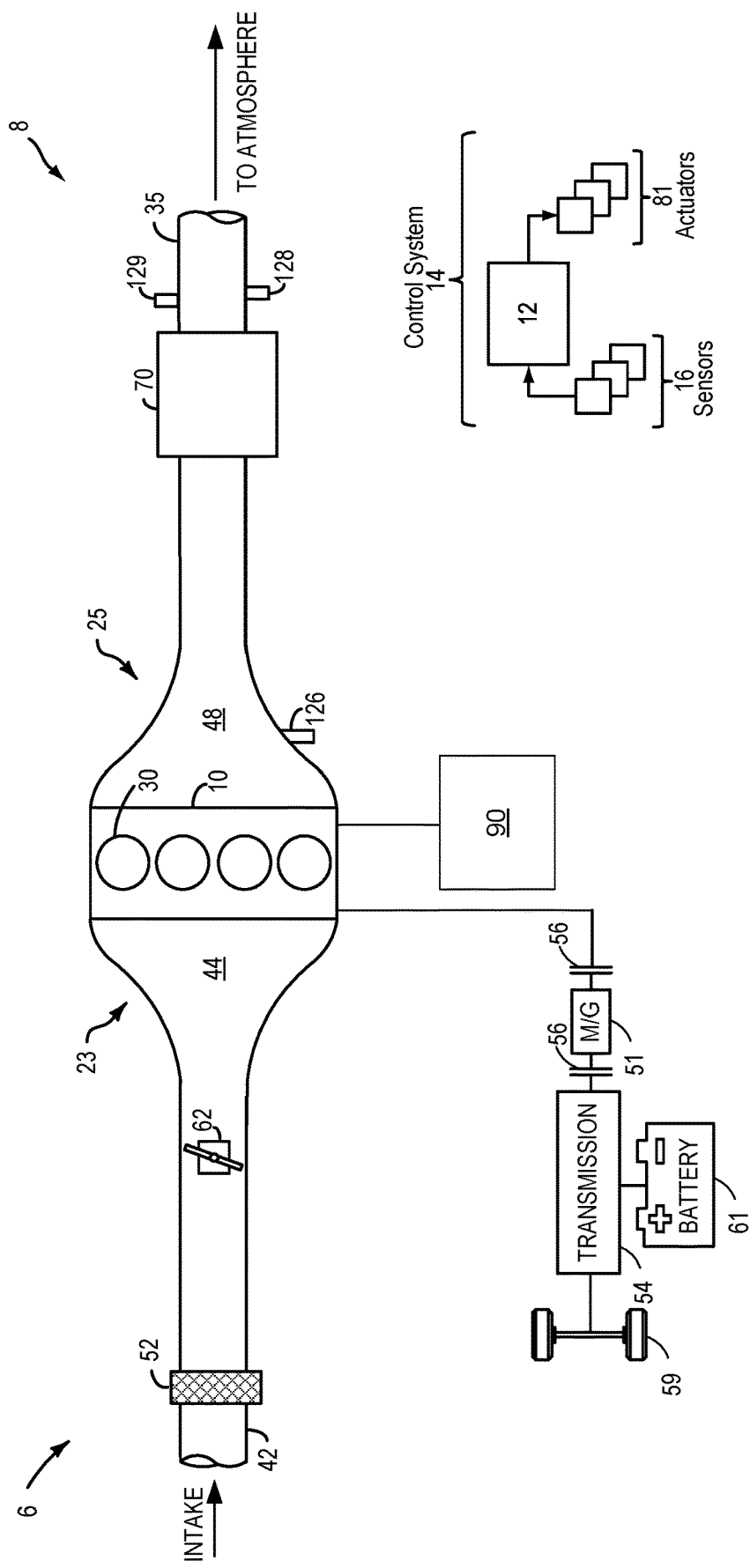
FIG. 1 illustrates an engine of a hybrid vehicle.
Figure 2:
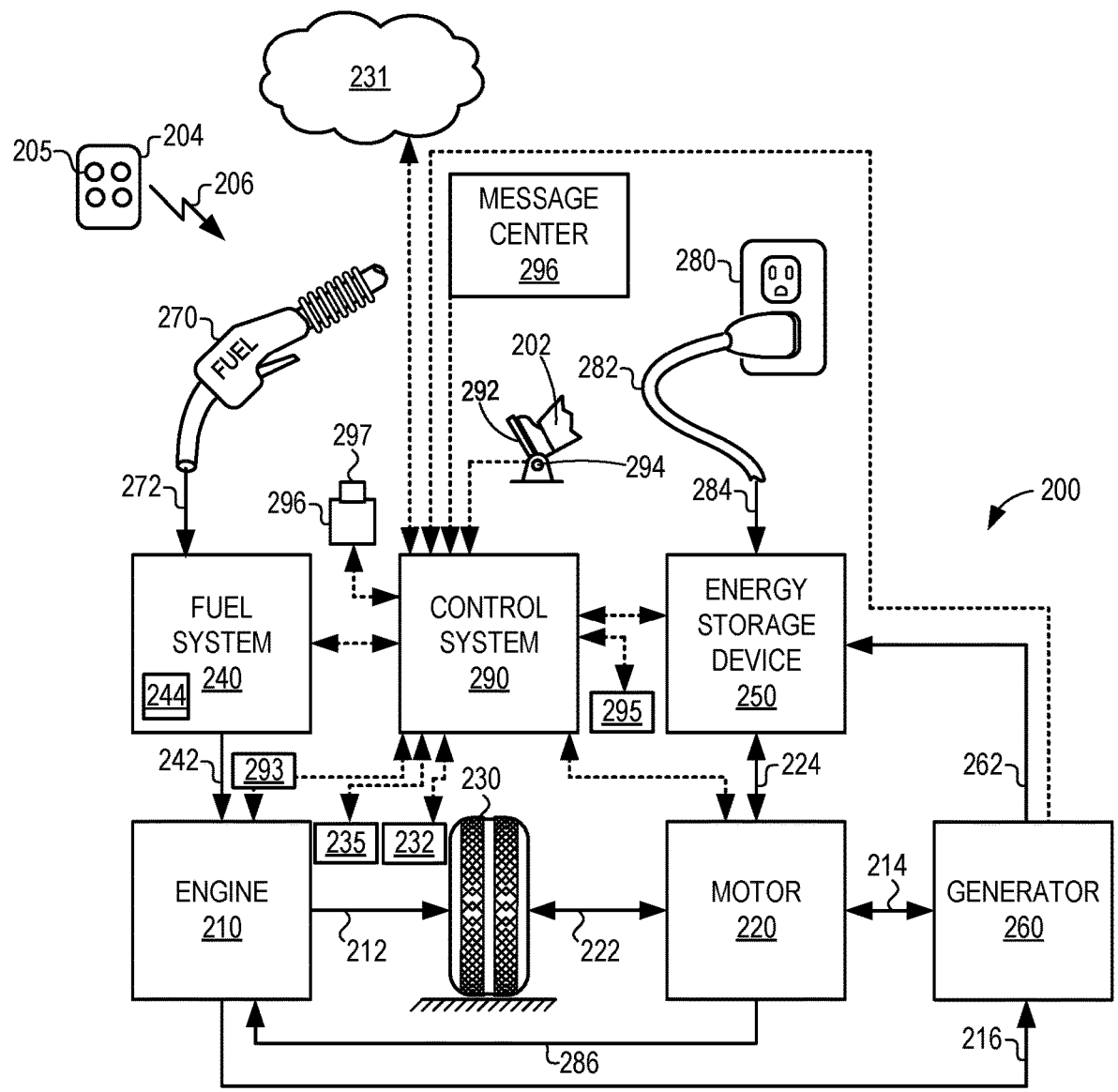
FIG. 2 schematically illustrates an example of a vehicle propulsion system.

The following description relates to a decoupler for an alternator or an electric motor. The decoupler may be integrated into an engine front end accessory drive (FEAD) system, wherein the decoupler may decrease vibrations and noise from an alternator or a belt driven integrated starter-generator (BISG). An example of an engine comprising an electric motor is illustrated in FIGS. 1 and 2.

Figure 3A:
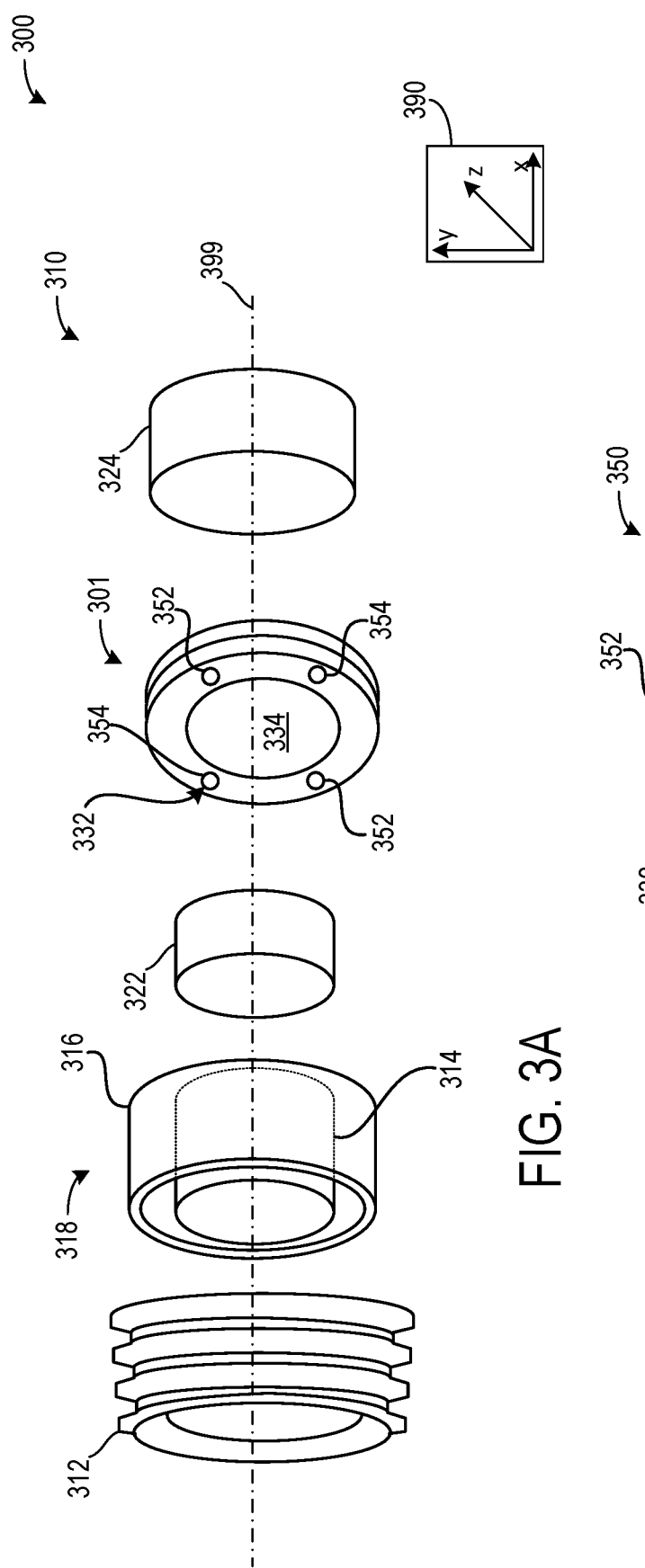
FIG. 3A illustrates a perspective view of an isolator in a one-way clutch.
Figure 3B:
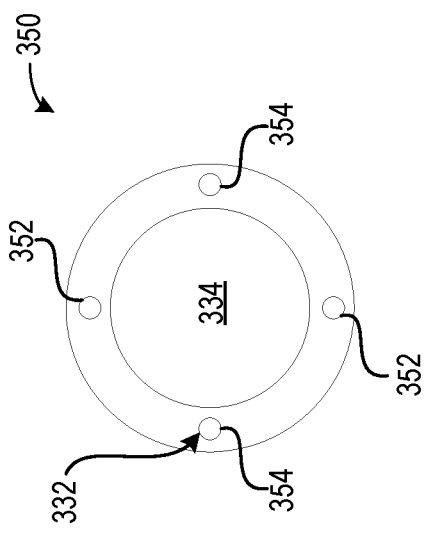
FIG. 3B illustrates a detailed via of the isolator.

The decoupler may be included in an overdriven alternator pulley configuration in conjunction with a one-way clutch as illustrated in FIG. 3A. The decoupler may comprise a flexible material, wherein the material is flexible about a three-dimensional axis system so as to allow the decoupler to isolate inertia in a rotational dimension. A detailed view of the decoupler is illustrated in FIG. 3B. The decoupler is further configured to compensate for displacement in one or more of an axial, a lateral, or an angular displacement between the one-way clutch and a drive shaft as illustrated in FIGS. 4A, 4B, and 4C. A non-linear torsional stiffness of the decoupler is graphically illustrated in FIG. 5.

Figure 6:
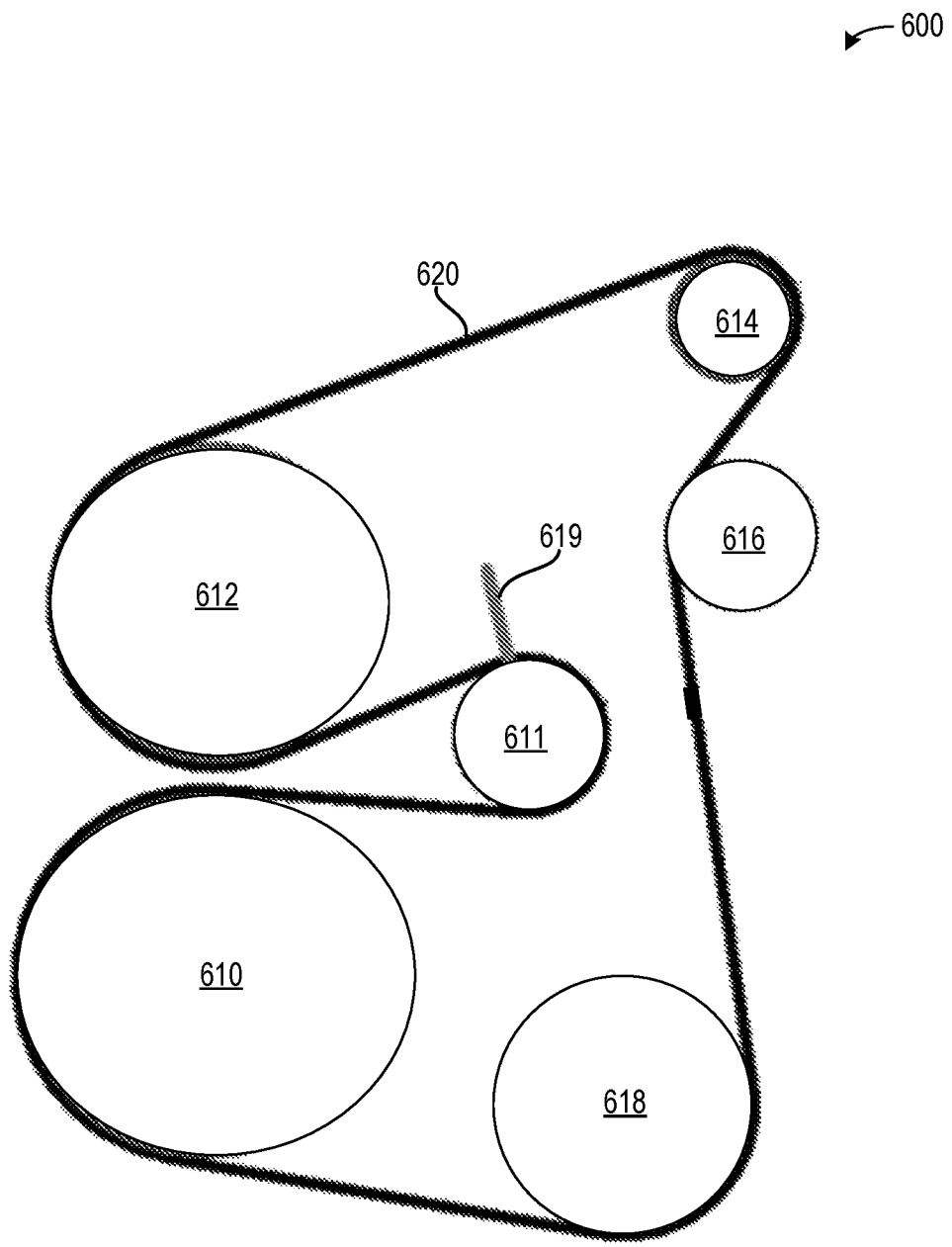
FIG. 6 illustrates an example FEAD with an alternator.
Figure 7:
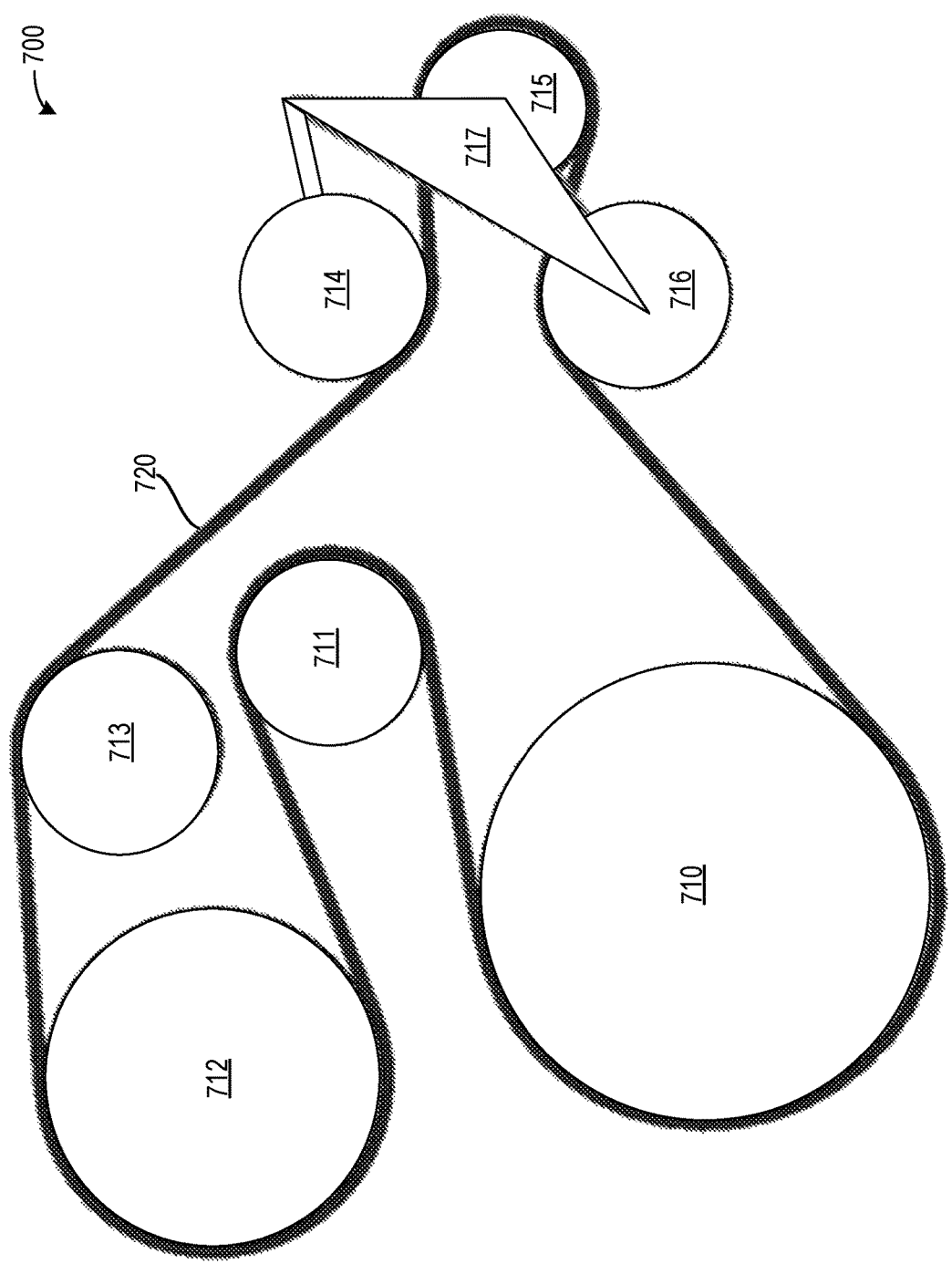
FIG. 7 illustrates an example FEAD with a BISG.

FIG. 6 illustrates an example configuration of a FEAD arrangement comprising an alternator. FIG. 7 illustrates an example configuration of a FEAD arrangement comprising a BISG.

Figure 8A:
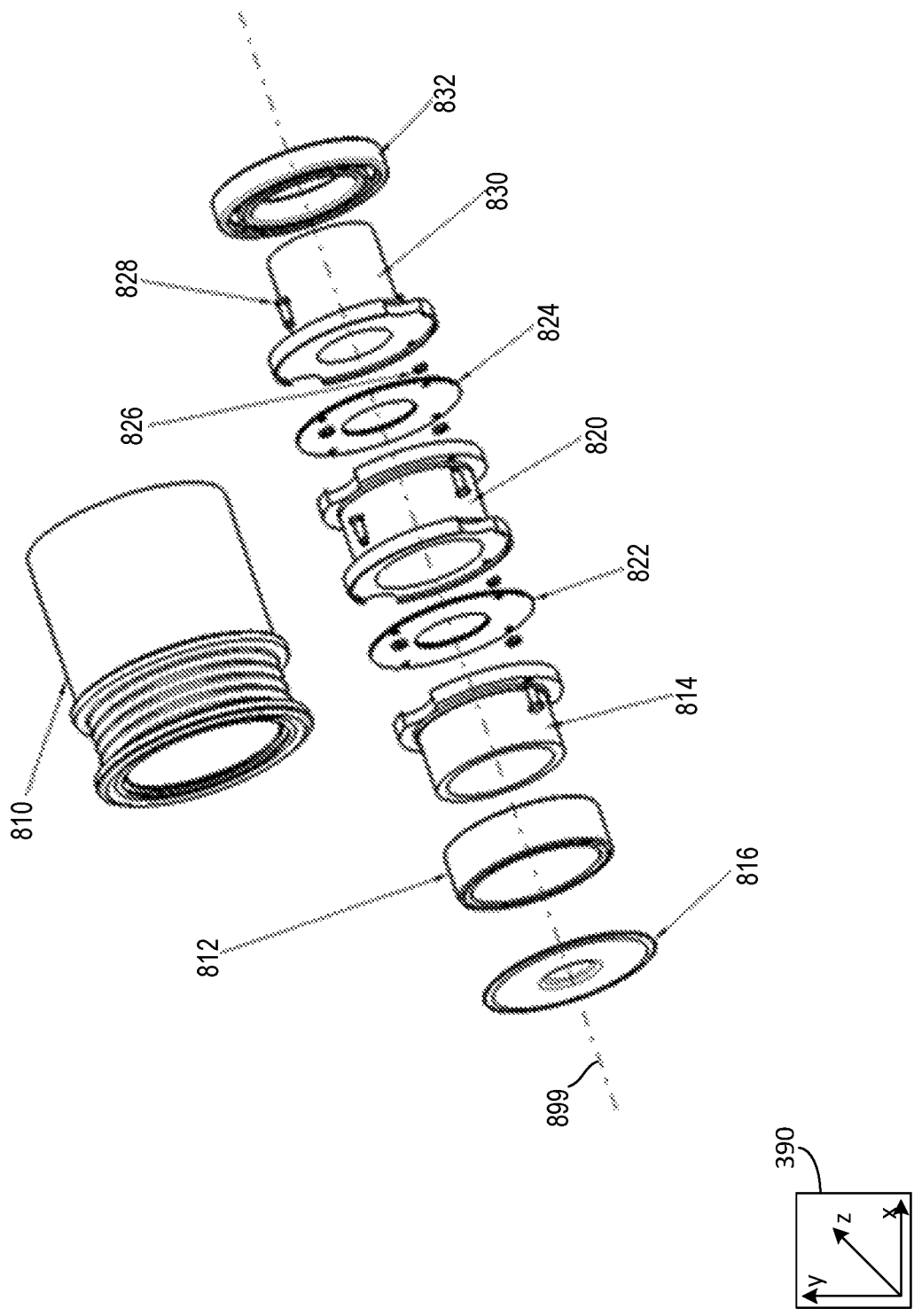
FIG. 8A illustrates an example of a one-way clutch comprising a laminated isolator.
Figure 8B:
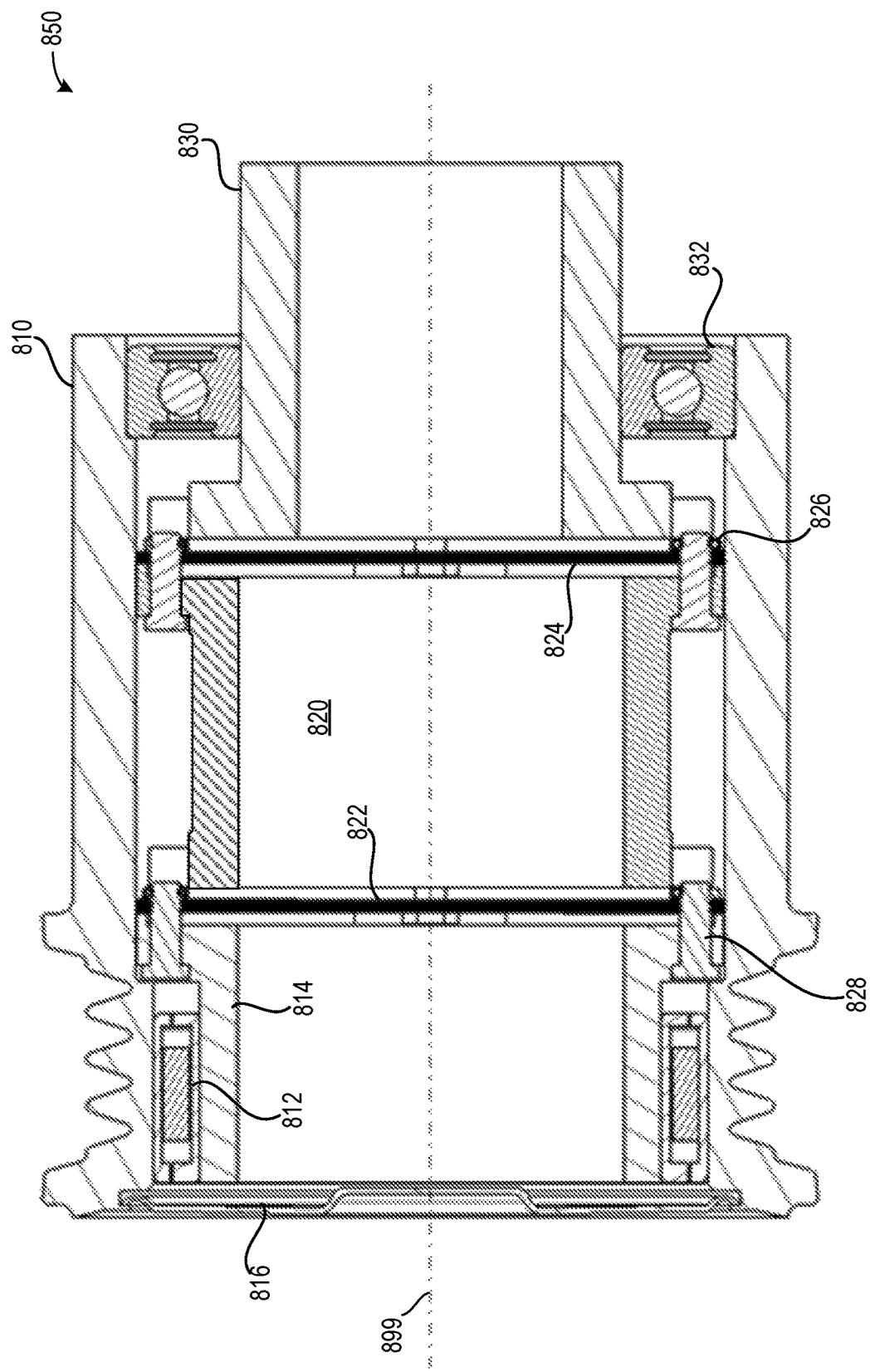
FIG. 8B illustrates a cross-section of the one-way clutch taken along cutting plane.
Figure 8C:
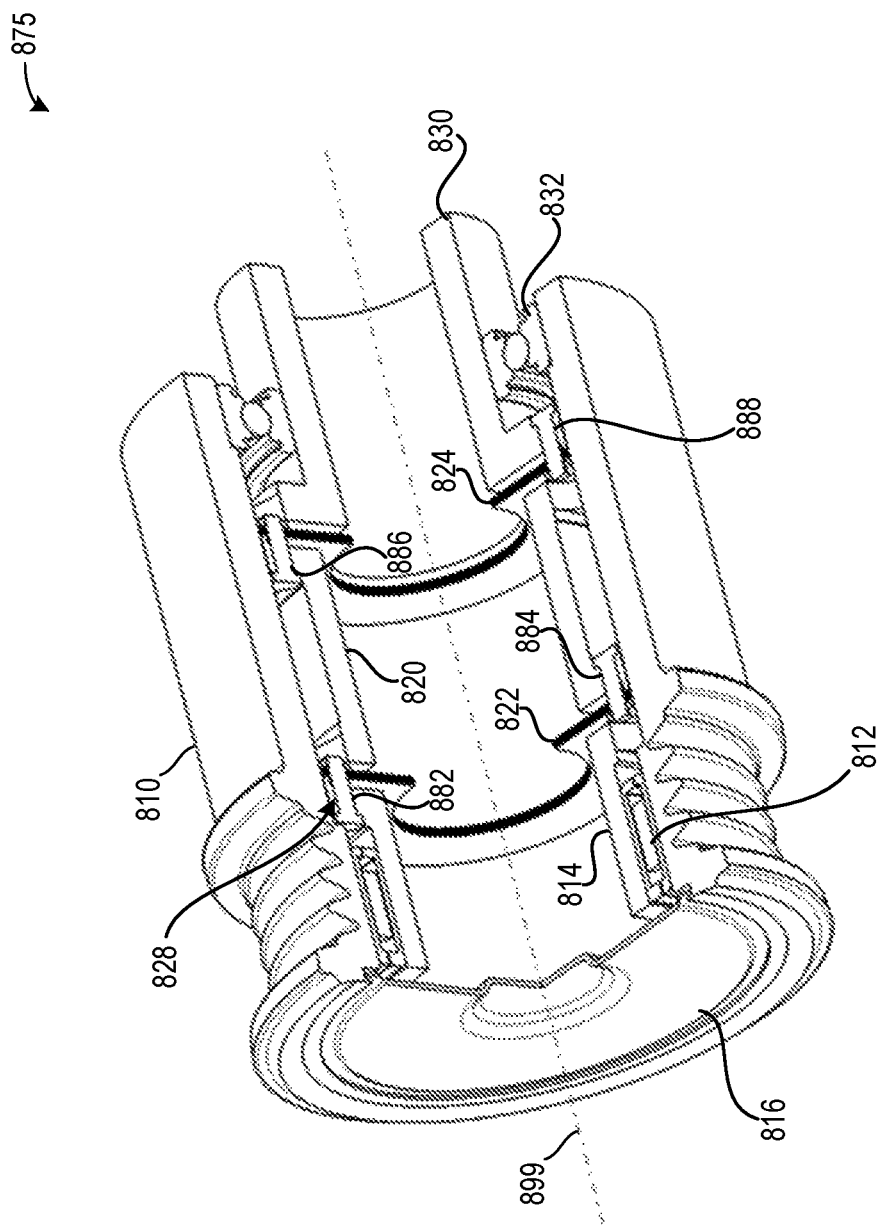
FIG. 8C illustrates a cut-out of the one-way clutch.
Figure 9:
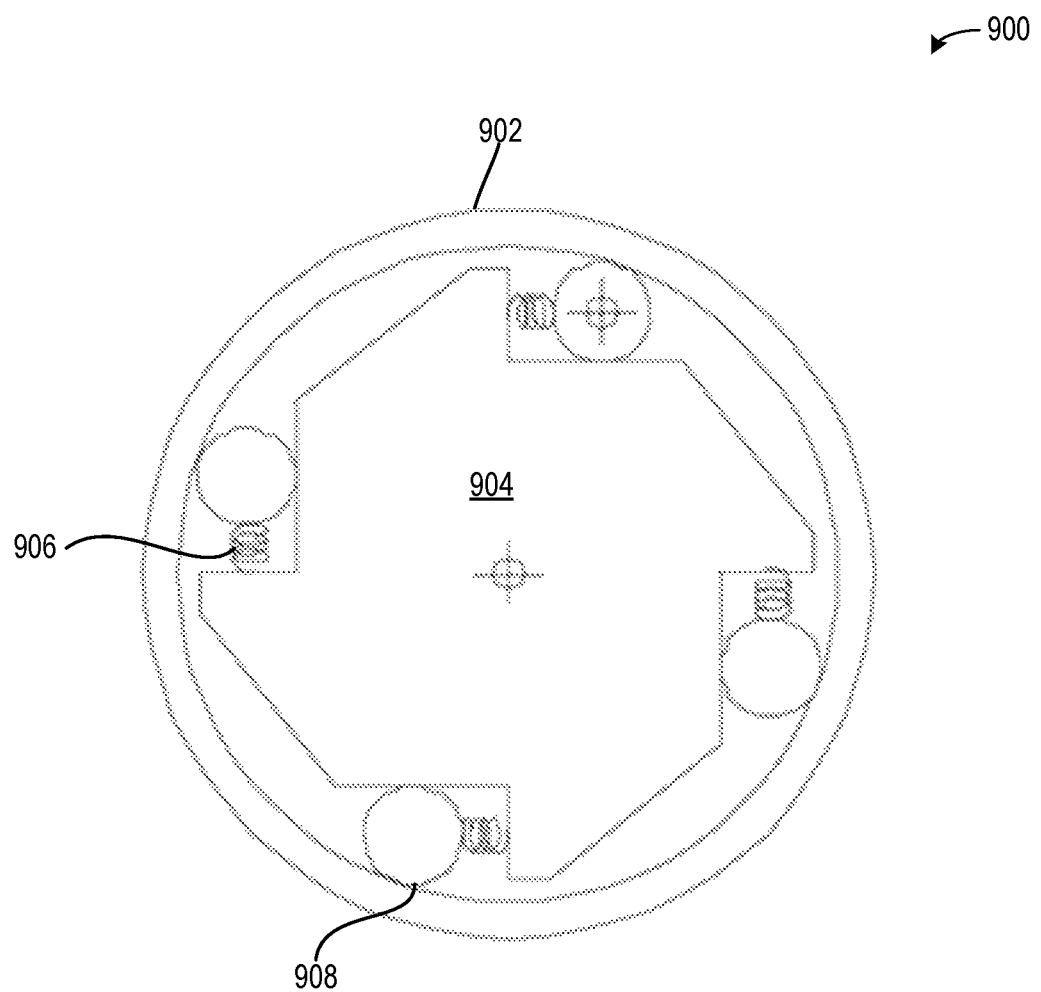
FIG. 9 illustrates an example of a one-way clutch comprising springs.

FIGS. 8A, 8B, and 8C illustrate an additional embodiment of a one-way clutch comprising a laminated decoupler. The one-way clutch with the laminated decoupler may be incorporated into the FEAD arrangements of FIGS. 6 and 7. An example of a roller-type one-way clutch is illustrated in FIG. 9.

FIGS. 1, 3A, 3B, 4, and 9 show example configurations with relative positioning of the various components of the present disclosure. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a schematic depiction of a hybrid vehicle system 6 that can derive propulsion power from engine system 8 and/or an on-board energy storage device. An energy conversion device, such as a generator, may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6. As another example, the actuators may include the throttle 62.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 6 comprises multiple sources of torque available to one or more vehicle wheels 59. In other examples, vehicle 6 is a conventional vehicle with only an engine, or an electric vehicle with only electric machine(s). In the example shown, vehicle 6 includes engine 10 and an electric machine 51. Electric machine 51 may be a motor or a motor/generator. A crankshaft of engine 10 and electric machine 51 may be connected via a transmission 54 to vehicle wheels 59 when one or more clutches 56 are engaged. In the depicted example, a first clutch 56 is provided between a crankshaft and the electric machine 51, and a second clutch 56 is provided between electric machine 51 and transmission 54. Controller 12 may send a signal to an actuator of each clutch 56 to engage or disengage the clutch, so as to connect or disconnect crankshaft from electric machine 51 and the components connected thereto, and/or connect or disconnect electric machine 51 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 51 receives electrical power from a traction battery 61 to provide torque to vehicle wheels 59. Electric machine 51 may also be operated as a generator to provide electrical power to charge battery 61, for example during a braking operation.

In one example, the electric machine 51 may comprise a P0 architecture, wherein the electric machine is integrated in a front end accessory drive (FEAD) 90. Additionally or alternatively, the FEAD 90 may comprise an alternator or BISG pulley separate from the electric machine 51. In such an arrangement, the electric machine may replace an alternator with regard to function and packaging space. In one example, the electric machine 51 may be a belt-integrated starter generator (BISG or e-machine) which may be configured to provide torque to a powertrain or produce electricity. However, it will be appreciated that the architecture of the vehicle 6 may deviate from the P0 architecture (e.g., P1 or P2 architectures) such that the electric machine 51 is not integrated into the FEAD and/or such that both the electric machine 51 and an alternator are present.

At any rate, as will be described in greater detail below, an inertia isolator is configured to provide isolation of the alternator and/or the BISG in a rotational dimension. The inertia isolator described herein may operate in a larger range than the isolator of the previous example. In one example, the inertia isolator comprises a laminated membrane which provides a non-linear isolation. The inertia isolator may be free of hydraulic fluid. In this way, a torsional spring or other type of isolator may be omitted and the inertia isolator of the present disclosure may be used while providing enhanced inertia isolation over a greater range.

FIG. 2 illustrates an example vehicle propulsion system 200 which may be used similarly to hybrid vehicle system 6 of FIG. 1. Vehicle propulsion system 200 includes a fuel burning engine 210 and a motor 220. As a non-limiting example, engine 210 comprises an internal combustion engine and motor 220 comprises an electric motor. Engine 210 may be used substantially similarly to engine 10 of FIG. 1 and motor 220 may be used similarly to electric machine 51 of FIG. 1. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (i.e., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

In another example, the engine may be equipped with a start/stop (S/S) feature 293, wherein the engine 210 may be automatically shut down during times when the vehicle is not moving, or when the vehicle speed is below a threshold speed, when engine speed is below a threshold engine speed, etc. Control system 290 may be connected to engine 210 and S/S feature 293, for performing the start-stop functions. Advantages to the S/S functionality may include an improvement in fuel economy over other vehicles that do not employ such technology. During the start/stop the vehicle may be propelled via its momentum and not by the engine 210 or the motor 220.

Herein, "automatically" executing various vehicle features, such as S/S, refers to execution of the various features without vehicle operator input. That is to say, the vehicle operator does not directly signal or request the S/S or other automatic features to be executed via depression of a dedicated actuator, such as a button. As such, automatic features are automatically executed in a response to current operating conditions and may not be directly signaled by the operator.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system or a hybrid propulsion. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, motor 220 may be configured to rotate the engine unfueled in a forward (e.g., default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. In some examples, control system 290 may be used similarly to controller 12 of FIG. 1. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in HEV, whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnect between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g., WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g., cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection.

Vehicle system 200 may also include an on-board navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example. The onboard cameras 235 may be arranged on an exterior surface of the vehicle so that an area surrounding and/or adjacent to the vehicle may be visualized.

Controller 12 may be configured as a conventional microcomputer including a microprocessor unit, input/output ports, read-only memory, random access memory, keep alive memory, a controller area network (CAN) bus, etc. Controller 12 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

Turning now to FIG. 3A, it shows an embodiment of an isolator 301 in a vehicle system 300. In one example, the isolator 301 is a flexible membrane decoupler 301. In the example of FIG. 3A, the isolator 301 is illustrated as part of an alternator 310 system, wherein the isolator 301 may be tuned to a belt drive system to reduce vibrations which may result in less belt noise and a smoother, more efficient accessory belt drive system.

An axis system 390 comprising three axes, namely an x-axis parallel to a horizontal direction, a y-axis parallel to a vertical direction, and a z-axis perpendicular to the x- and y-axes, is provided for reference. A central axis 399 of the alternator system 310 and its components, including the decoupler 301 is parallel to the x-axis in the example of FIG. 3A. As will be described herein, due to a flexibility of the decoupler 301, the decoupler is configured to flex along each of the x-, y-, and z-axes.

The alternator system 310 comprises a belt pulley 312, an inner ring 314 and an outer ring 316 of a one-way clutch 318, a drive shaft 322, and a rotor 324. The drive shaft 322 may be coupled to belt pulley 312 via the one-way clutch 318. As such, rotation of the drive shaft 322 may result in rotation of the belt pulley 312 during some operating conditions. In one example, additionally or alternatively, the belt pulley 312 is arranged at least partially between the inner ring 314 and the outer ring 316.

The one-way clutch 318 may comprise a free-wheeling configuration or a co-rotating configuration. In the example of a free-wheeling configuration, the one-way clutch 318 may disconnect the drive shaft 322 from the inner ring 314 in response to the drive-shaft 322 rotating faster than the inner ring 314 and/or the belt pulley 312, which may occur during a deceleration event. In an example of a freewheel sprag clutch, rollers of the sprag may slip when turning in a first direction, however, if torque is applied so as to turn the sprag in a second direction, the rollers may tilt and wedge themselves resulting in a binding action that may block rotation in the second direction.

It will be appreciated that the rotor 324 may be a rotor of the electric machine 51 of FIG. 1. As mentioned previously, the rotor 324 may also be an alternator rotor or an electric motor rotor as part of the FEAD system 90 of engine 10 of FIG. 1.

The belt pulley 312 may be coupled to the rotor 324 via a ball bearing, which may allow the belt pulley 312 to free spin during some conditions, such as a braking event. The rotor 324 may be coupled to a housing via a pair of bearings, different than the ball bearings.

The isolator 301 may be arranged in a position outside of a circumference of the drive shaft 322. The isolator 301 may be configured to compensate for an axial, a lateral, and/or angular displacement between the one-way clutch 318 and the drive shaft 322. More specifically, the isolator 301 is configured to compensate for an axial displacement 410 between the inner ring 314 of the one-way clutch 318 and the drive shaft 322 as illustrated in FIG. 4A. Furthermore, the isolator 301 may be configured to compensate for a lateral displacement 420 of the inner ring 314 of the one-way clutch 318 and the drive shaft 322 as illustrated in FIG. 4B. Additionally, the isolator 301 may be configured to compensate for an angular displacement 430 of the inner ring 314 of the one-way clutch 318 and the drive shaft 322 as illustrated in FIG. 4C. In one example, displacements may occur due to manufacturing inaccuracies, deformation under load, and/or a temperature change during operation.

In one example, the isolator 301 is a laminated membrane with a non-linear torsional stiffness. As such, the isolator 301 may be configured to compensate for displacements in different directions, including a rotational dimension, between the inner ring 314 and the drive shaft 322. The non-linear torsional stiffness is graphically illustrated in FIG. 5 via graph 500. Therein, as an angle of the angular displacement increases, a torque load (e.g., a torsional stiffness) also increases, wherein the torque load increases at a higher rate than a linear rate. As described above, previous examples of decouplers have a linear torsional stiffness, resulting in unwanted NVH during some conditions. That is to say, the isolator of the present disclosure may operate at a larger frequency range for the alternator/BISG relative to the previous example. One example frequency of the larger frequency range may include first order engine torsional vibrations which may occur near idle speeds. The isolator 301 may be configured to reduce and/or eliminate the resonances associated with the first order engine torsional vibrations.

By laminating the isolator 301, it may comprise two or more layers of a material on an outer surface of the membrane. In one example, the isolator 301 comprises cold rolled steel sheet or surface-treated spring steel plate configuring the laminated membrane. Also, the isolator may be simple to manufacture and comprise a long life span, while not demanding lubrication or maintenance, resulting in a reduced cost of manufacture and operation. The laminated membrane may compensate the axial, lateral and/or angular displacement due to the manufacturing, assembling misalignments, deformation under loading and temperature change during running, which may be due to elastic deformation. The number of laminated membranes used may vary according to different transmitted torque. It can mitigate the vibration at high frequency and the impact at low frequency due to its non-linear torsional stiffness (see FIG. 5). The number of the holes, shape and a thickness of the laminated membrane may be adjusted according to different applications. The laminated membrane may comprise a circular, triangular, square, rectangular, polyhedron, or other similar shape. The laminated membrane can have 4 holes, 6 holes etc. with a thickness between 0.15 mm-0.5 mm. Furthermore, and as described in greater detail below, a coupling configuration of the laminated membrane may reduce an impact and a vibration and compensate axial, lateral, and angular displacements.

Turning to FIG. 3B, it shows a face-on view 350 of the isolator 301. The face-on view 350 reveals a central opening 334 through which the drive shaft 322 may extend. The face-on view 350 further illustrates a plurality of openings 332 symmetrically arranged between the central opening 334 and an outer circumference of the isolator 301. In one example, the plurality of openings 332 may be divided into pairs, including a first pair 352 and a second pair 354. Openings of the first pair 352 may be sandwiched between openings of the second pair 354 such that the openings of the first and second pairs alternate with one another. The rotor 324 may be physically coupled to the isolator 301 via the first pair 352 and the drive shaft 322 may be physically coupled to the isolator 301 via the second pair 354.

As illustrated in FIG. 3A, the isolator 301 comprises a ring-shaped cross-section taken along a direction perpendicular to the central axis 399. Said another way, the isolator 301 comprises a cylindrical shape with a hollow interior. In this way, the isolator 301 may not be shaped as a helical spring. Furthermore, the decoupler 301 may be free of hydraulic fluids.

Turning now to FIG. 6 it shows an embodiment 600 of a FEAD system comprising a belt 620 at least partially surrounding each of a crankshaft 610, a tensioner 611, a fan 612, an alternator 614, an idler 616, and an air compressor 618. A poly-wedge 619 is arranged at the tensioner 611.

Turning now to FIG. 7, it shows an embodiment 700 of a FEAD system comprising a belt 720 at least partially surrounding each of a crankshaft 710, a first idler 711, a water pump 712, a second idler 713, a first tension pulley 714, an integrated starter/generator 715, and a second tension pulley 716. A poly-wedge 717 is coupled to the first tension pulley 714, the integrated starter/generator 715, and the second tension pulley 716.

Turning now to FIG. 8A, it shows an embodiment 800 of a pulley 810 comprising a one-way clutch 812 configured to surround an outer portion of a shaft 814. A seal cap 816 may be positioned at a first extreme end of the shaft 814. The seal cap 816 may cover each of the alternator shaft 814 and the one-way clutch 812.

A first laminated decoupler 822 may be arranged at a second extreme end of the alternator shaft 814, wherein the second extreme end is opposite the first extreme end. Additionally, the first laminated decoupler 822 is arranged at a first extreme end of a connecting shaft 820 such that the first laminated decoupler 822 is positioned directly between the alternator shaft 814 and the connecting shaft 820. A second laminated decoupler 824 is arranged at a second extreme end of the connecting shaft 820, wherein the second extreme end is opposite the first extreme end. The second laminated decoupler 824 may be positioned between the connecting shaft 820 and a rotor 830.

Each of the first laminated decoupler 822 and the second laminated decoupler 824 may comprise a plurality of nuts 826 through which fasteners 828 may be threaded to physically couple the decouplers to the shaft 814, the connecting shaft 820, and the rotor 830.

In one example, an automobile engine alternator or BISG roller type one-way clutch decoupler comprises an alternator or BISG pulley 810, press fit between an inner ring 812A of one-way clutch 812 and the shaft 814 of an alternator or BISG. A first laminated membrane 822 connects the shaft 814 of alternator or BISG and one end of the connecting shaft 820. A second laminated membrane 824 connects the other end of connecting shaft 820 and the rotor 830 of alternator or BISG. The rotor 830 of alternator or BISG is supported by a ball bearing 832 and sits on the pulley 810 of the alternator or BISG. The ball bearing 832 is press fit between a ball bearing outer surface and the pulley 810. More specifically, the ball bearing 832 is press fit between ball bearing outer surface and the rotor 830 of alternator or BISG.

In one example, the pulley 810 is a non-limiting example of alternator pulley 312 of FIG. 3A. The one-way clutch 812 is a non-limiting example of the one-way clutch 318 of FIG. 3A. The first laminated decoupler 822 and/or the second laminated decoupler 824 are non-limiting examples the decoupler 301 of FIG. 3A.

A cross-section 850 of the pulley 810 taken along a cutting plane parallel to a central axis 899 is shown in FIG. 8B. A partial cut-away view of the pulley 810 is illustrated in FIG. 8C. In FIG. 8C, fasteners 828 are divided into groups including a first bolt 882 of a first group of bolts, a second bolt 884 of a second group of bolts, a third bolt 886 of a third group of bolts, and a fourth bolt 888 of a fourth group of bolts. By orienting the different groups of bolts in opposite directions, a force load applied to the laminated membranes may be more evenly distributed such that a longevity and user experience may be enhanced.

The first bolt 882 extends in a first direction and physically couples the shaft 814 to the first laminated decoupler 822. The second bolt 884 extends in a second direction, opposite the first direction, and physically couples the connecting shaft 820 to the first laminated decoupler 822. The third bolt 886 extends in the first direction and physically couples the connecting shaft 820 to the second laminated decoupler 824. The fourth bolt 888 extends in the second direction and physically couples the rotor 830 to the second laminated decoupler 824.

Turning to FIG. 9, it shows roller-type one-way clutch decoupler 812 for an alternator or a BISG. The roller-type one-way clutch decoupler 900 comprises an outer ring 902 with an identical rotating speed. An inner ring 904 rotates relative to an alternator shaft, such as shaft 814 of FIG. 8A. The inner ring 904 is arranged on an inner roller 906 of the roller-type one-way clutch decoupler 900. A plurality of helical springs 908 are arranged on a direction bias voltage roller, between the inner ring 904 and the outer ring 902.

A roller holding portion may comprise a predetermined wedge angle. A holding portion for the plurality of helical springs 908 is arranged on the inner ring 904, wherein the roller 906 is arranged in a roller holding portion and pressed into a narrowest thruster of the roller holding portion via the plurality of helical springs 908.

The roller holding portion is provided with lubricant to reduce the wearing and degradation of a contact surface between the inner roller 906, inner ring 904, and outer ring 902 of the one-way clutch 812. The seal cap 816 rests on the flange of roller-type one-way clutch, 812 which is used to stop the contamination to the clutch, and define a volume of the clutch to maintain lubricant therein.

Said another way, the predetermined wedge angle may correspond to a clearance, wherein the inner roller 906 may be moved out of the clearance when the one-way clutch is overrun. However, when the gear drives through the clutch, the inner roller 906 may contact inner surfaces of the clearance and drive the drive shaft.

In this way, a FEAD system may comprise an isolator configured as a flexible laminated membrane decoupler configured to limit vibrations and noises at a greater frequency range relative to previous examples including springs and dampeners utilizing hydraulic fluids. The technical effect of laminating the decoupler is to provide a non-linear torsional stiffness, thereby enabling the flexible laminated decoupler to compensate for axial, lateral, and angular displacements between a one-way clutch and a driveshaft. By doing this, a user experience may be enhanced through a greater range of engine operating conditions.

An embodiment of a system, comprises a drive shaft coupled to a belt pulley, wherein a flexible laminated membrane decoupler is arranged at an interface between the drive shaft and a rotor.

A first example of the system further includes where the rotor is a belt integrated starter/generator rotor.

A second example of the system, optionally including the first example, further includes where the rotor is an alternator rotor.

A third example of the system, optionally including one or more of the previous examples, further includes where the flexible laminated membrane decoupler is one of a plurality of flexible laminated membrane decouplers.

A fourth example of the system, optionally including one or more of the previous examples, further includes where the flexible laminated membrane decoupler comprises a cold rolled steel sheet.

A fifth example of the system, optionally including one or more of the previous examples, further includes where the flexible laminated membrane decoupler comprises a surface treated spring steel plate.

A sixth example of the system, optionally including one or more of the previous examples, further includes where the flexible laminated membrane decoupler comprises a plurality of openings including a first pair and a second pair, wherein the first pair is coupled to the drive shaft and the second pair is coupled to the rotor.

A seventh example of the system, optionally including one or more of the previous examples, further includes where openings of the first pair and the second pair alternate, and wherein openings of the first pair are sandwiched by openings of the second pair.

An embodiment of a front end accessory drive, comprises a flexible, laminated decoupler configured to flex in an axial, a lateral, and an angular direction relative to a central axis of a one-way clutch and a shaft.

A first example of the front end accessory drive further includes where the shaft is an alternator shaft.

A second example of the front end accessory drive, optionally including the first example, further includes where the shaft is a belt-integrated starter/generator shaft.

A third example of the front end accessory drive, optionally including one or more of the previous examples, further includes where the decoupler is one of a plurality of decouplers and where the shaft is a first shaft, wherein a first decoupler is arranged between the first shaft and a second shaft, and wherein a second decoupler is arranged between the second shaft and a rotor, wherein the second shaft is different than the first shaft.

A fourth example of the front end accessory drive, optionally including one or more of the previous examples, further includes where a first group of fasteners extends in a first direction to physically couple the first shaft to the first decoupler, wherein a second group of fasteners extend in a second direction, opposite the first direction, to physically couple the second shaft to the first decoupler, wherein a third group of fasteners extend in the first direction to physically couple the second shaft to the second decoupler, and wherein a fourth group of fasteners extend in the second direction to physically couple the rotor to the second decoupler.

A fifth example of the front end accessory drive, optionally including one or more of the previous examples, further includes where fasteners of the first group alternate with fasteners of the second group.

A sixth example of the front end accessory drive, optionally including one or more of the previous examples, further includes where fasteners of the third group alternate with fasteners of the fourth group.

An example of an engine system comprises a pulley system comprising a drive shaft, a one-way clutch, a connecting shaft, and a rotor, further comprising a first flexible laminated membrane is arranged between the drive shaft and the connecting shaft, and a second flexible laminated membrane is arranged between the connecting shaft and the rotor, wherein each of the first and second flexible laminated membranes are configured to flex in axial, lateral, and angular directions relative to a central axis of the drive shaft and the connecting shaft.

A first example of the engine system further includes where the rotor is an alternator rotor of a belt-integrated starter/generator rotor.

A second example of the engine system, optionally including the first example, further includes where the first and second flexible laminated membranes are not a spring.

A third example of the engine system, optionally including one or more of the previous examples, further includes where the first and second flexible laminated membranes are free of hydraulic fluid.

A fourth example of the engine system, optionally including one or more of the previous examples, further includes where a first group of fasteners extends in a first direction to physically couple the drive shaft to the first flexible laminated membrane, wherein a second group of fasteners extend in a second direction, opposite the first direction, to physically couple the connecting shaft to the first flexible laminated membrane, wherein a third group of fasteners extend in the first direction to physically couple the connecting shaft to the second flexible laminated membrane, and wherein a fourth group of fasteners extend in the second direction to physically couple the rotor to the second flexible laminated membrane.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a drive shaft coupled to a belt pulley, wherein a flexible laminated membrane decoupler is arranged at an interface between the drive shaft and a rotor, wherein the flexible laminated membrane decoupler comprises a plurality of openings including a first pair and a second pair, and wherein the first pair is coupled to the drive shaft and the second pair is coupled to the rotor.

2. The system of claim 1, wherein the rotor is a belt integrated starter/generator rotor.

3. The system of claim 1, wherein the rotor is an alternator rotor.

4. The system of claim 1, wherein the flexible laminated membrane decoupler is one of a plurality of flexible laminated membrane decouplers.

5. The system of claim 1, wherein the flexible laminated membrane decoupler comprises a cold rolled steel sheet.

6. The system of claim 1, wherein the flexible laminated membrane decoupler comprises a surface treated spring steel plate.

7. The system of claim 1, wherein openings of the first pair and the second pair alternate, and wherein openings of the first pair are sandwiched by openings of the second pair.

8. A front end accessory drive, comprising:
a flexible, laminated decoupler configured to flex in an axial, a lateral, and an angular direction relative to a central axis of a one-way clutch and a shaft, wherein the decoupler is one of a plurality of decouplers and the shaft is a first shaft, wherein a first decoupler is arranged between the first shaft and a second shaft, wherein a second decoupler is arranged between the second shaft and a rotor, and wherein the second shaft is different than the first shaft.

9. The front end accessory drive of claim 8, wherein the shaft is an alternator shaft.

10. The front end accessory drive of claim 8, wherein the shaft is a belt-integrated starter/generator shaft.

11. The front end accessory drive of claim 8, wherein a first group of fasteners extends in a first direction to physically couple the first shaft to the first decoupler, wherein a second group of fasteners extend in a second direction, opposite the first direction, to physically couple the second shaft to the first decoupler, wherein a third group of fasteners extend in the first direction to physically couple the second shaft to the second decoupler, and wherein a fourth group of fasteners extend in the second direction to physically couple the rotor to the second decoupler.

12. The front end accessory drive of claim 11, wherein fasteners of the first group alternate with fasteners of the second group.

13. The front end accessory drive of claim 11, wherein fasteners of the third group alternate with fasteners of the fourth group.

14. An engine system, comprising:
a pulley system comprising a drive shaft, a one-way clutch, a connecting shaft, and a rotor, further comprising a first flexible laminated membrane is arranged between the drive shaft and the connecting shaft, and a second flexible laminated membrane is arranged between the connecting shaft and the rotor, wherein each of the first and second flexible laminated membranes are configured to flex in axial, lateral, and angular directions relative to a central axis of the drive shaft and the connecting shaft.

15. The engine system of claim 14, wherein the rotor is an alternator rotor of a belt-integrated starter/generator rotor.

16. The engine system of claim 14, wherein the first and second flexible laminated membranes are not a spring.

17. The engine system of claim 14, wherein the first and second flexible laminated membranes are free of hydraulic fluid.

18. The engine system of claim 14, wherein a first group of fasteners extends in a first direction to physically couple the drive shaft to the first flexible laminated membrane, wherein a second group of fasteners extend in a second direction, opposite the first direction, to physically couple the connecting shaft to the first flexible laminated membrane, wherein a third group of fasteners extend in the first direction to physically couple the connecting shaft to the second flexible laminated membrane, and wherein a fourth group of fasteners extend in the second direction to physically couple the rotor to the second flexible laminated membrane.

* * * * *